(12) United States Patent
Kim et al.

(10) Patent No.: US 7,190,748 B2
(45) Date of Patent: Mar. 13, 2007

(54) DIGITAL FRONT-END FOR WIRELESS COMMUNICATION SYSTEM

(75) Inventors: Younggyun Kim, Irvine, CA (US); Jaekyun Moon, Plymouth, MN (US)

(73) Assignee: DSP Group Inc., Santa Clara, CA (US)

(*) Notice: Subject to any disclaimer, the term of this patent is extended or adjusted under 35 U.S.C. 154(b) by 873 days.

(21) Appl. No.: 10/144,445

(22) Filed: May 10, 2002

(65) Prior Publication Data

US 2003/0072397 A1 Apr. 17, 2003

Related U.S. Application Data

(60) Provisional application No. 60/353,024, filed on Jan. 30, 2002, provisional application No. 60/313,269, filed on Aug. 17, 2001.

(51) Int. Cl.
*H04L 27/08* (2006.01)
*H04L 1/02* (2006.01)
*H04B 7/10* (2006.01)

(52) U.S. Cl. .................................. 375/345; 375/347

(58) Field of Classification Search ............... 375/232, 375/260, 267, 345, 347, 350; 330/134, 289
See application file for complete search history.

(56) References Cited

U.S. PATENT DOCUMENTS

| 3,879,664 | A | * | 4/1975 | Monsen | ...................... | 375/232 |
| 4,271,525 | A | * | 6/1981 | Watanabe | ................... | 375/232 |
| 5,937,059 | A | | 8/1999 | Kim et al. | | |
| 6,175,550 | B1 | | 1/2001 | van Nee | | |
| 6,226,507 | B1 | | 5/2001 | Ramesh et al. | | |
| 6,229,397 | B1 | * | 5/2001 | Miura | ....................... | 330/289 |

OTHER PUBLICATIONS

"High-speed Physical Layer in the 5 GHz Band" Part 11: Wireless LAN Medium Access Control (MAC) and Physical Layer (PHY) specifications, IEEE Std 802.11a-1999.
Timothy M. Schmidl et al., "Robust Frequency and Timing Synchronization for OFDM", IEEE Transaction on Communications, Dec. 1997, vol. 45, No. 12, pp. 1613-1621.
International Search Report from corresponding PCT Application Serial No. PCT/US02/26194 mailed Jan. 2, 2003 (5 pages).
Written Opinion from corresponding PCT Application Serial No. PCT/US02/26194 mailed Jun. 17, 2003 (4 pages).
International Preliminary Examination Report from corresponding PCT Application Serial No. PCT/US02/26194 mailed Oct. 9, 2003 (4 pages).

* cited by examiner

*Primary Examiner*—Don N. Vo
(74) *Attorney, Agent, or Firm*—Shumaker & Sieffert, P.A.

(57) ABSTRACT

A digital front-end for a wireless communication system incorporates gain control, signal detection, frame synchronization and carrier frequency offset (CFO) estimation and correction features configured for use with multiple receive antennas. The digital front-end may be applied to a wireless communication system in which transmitted signals carry a repeated signal pattern, such as orthogonal frequency division multiplexing (OFDM) systems. An example of a repeated signal pattern is the preamble of a signal transmitted according to the IEEE 802.11a wireless local area network (WLAN) standard. The signal detection, frame synchronization, and CFO estimation techniques make use of signals received from multiple antenna paths to provide enhanced performance. The gain control feature may be configured to adjust the gain in steps. The frame synchronization technique may operate as a function of gain control, handling the input signal differently before and after gain adjustment.

92 Claims, 11 Drawing Sheets

DIGITAL FRONT-END FOR WIRELESS COMMUNICATION SYSTEM

This application claims priority from U.S. provisional application Ser. No. 60/313,269, filed Aug. 17, 2001, and U.S. provisional application Ser. No. 60/353,024, filed Jan. 30, 2002, the entire content of each of which is incorporated herein by reference.

FIELD

The invention relates to wireless communication and, more particularly, to techniques for digital acquisition of wireless signals.

BACKGROUND

Wireless communication involves transmission of encoded information on a modulated radio frequency (RF) carrier signal. A wireless receiver includes an RF antenna that receives a wireless signal, and a demodulator that converts the RF signal to baseband. The wireless receiver may include a digital "front-end" that handles a variety of signal acquisition functions. For example, the digital front-end may perform signal detection, frame synchronization, carrier frequency offset (CFO) estimation and correction, and gain control.

The gain control function involves selection of a gain for amplification of the incoming wireless signal to increase signal amplitude but avoid saturation. Signal detection involves detecting the arrival of a transmitted wireless signal. Frame synchronization involves identification of the start of a transmitted symbol within the signal. The CFO estimation and correction function estimates the carrier frequency difference between the transmitter and receiver, and compensates for the difference in the receiver.

SUMMARY

The invention is directed to a digital front-end for a wireless communication system. A digital front-end, in accordance with the invention, may incorporate gain control, signal detection, frame synchronization and carrier frequency offset (CFO) estimation and correction features configured for use with wireless communication systems having one or more receive antennas. The digital front-end may be especially useful when combined with multiple receive antennas in a receive diversity arrangement.

The digital front-end may be applied to any wireless communication system in which transmitted signals carry a repeated signal pattern. However, the digital front-end may be especially useful in multi-carrier wireless systems, such as orthogonal frequency division multiplexing (OFDM) systems. An example of a repeated signal pattern is the preamble of a signal transmitted according to the IEEE 802.11a wireless local area network (WLAN) standard.

The signal detection, frame synchronization, and CFO estimation techniques can make use of signals received from multiple antenna paths to provide enhanced performance. The gain control feature may be configured to adjust the gain in steps. During the preamble period, for example, the amplitude of the received signal may vary due to gain control. The frame synchronization technique may be effective even when the signal amplitude varies under such conditions. In particular, the frame synchronization technique may operate as a function of gain control, handling the input signal differently before and after gain adjustment.

In one embodiment, the invention provides a method comprising receiving observations of a wireless signal via multiple antennas, measuring power levels of the observations, identifying a largest power level among the measured power levels, selecting an amplifier gain based on the largest measured power level, and applying the amplifier gain to each of the observations.

In another embodiment, the invention provides a method comprising receiving one or more observations of a wireless signal via one or more antennas, measuring a power level of each of the observations, generating a correlation of the measured power level, and indicating a signal detection based on the correlation and a delayed version of the measured power level.

In a further embodiment, the invention provides a method comprising receiving one or more observations of a wireless signal via one or more antennas, calculating an absolute squared value of an inner product between a unit vector of observation samples from the antennas and a time delayed unit vector of observation samples from the antennas, and identifying a largest absolute squared inner product value among the calculated absolute squared inner product values.

In another embodiment, the invention provides a method comprising receiving one or more observations of a wireless signal via one or more antennas, generating a correlation of the observations for each of the antennas, averaging the correlations over all of the antennas, and estimating a carrier frequency offset based on the angle of the averaged correlations.

In added embodiments, the invention provides wireless receivers capable of implementing the various methods.

The invention may provide one or more advantages. For example, the invention may take advantage of the presence of a repeated signal pattern in a wireless signal and receive diversity to promote enhanced signal detection, frame synchronization and CFO correction performance, even as signal gain varies. With enhanced performance, the invention can provide reduced incidents of false signal detection, more accurate frame synchronization, and more effective CFO correction.

Additional details of various embodiments are set forth in the accompanying drawings and the description below. Other features, objects and advantages will become apparent from the description and drawings, and from the claims.

DETAILED DESCRIPTION

Figure 1:
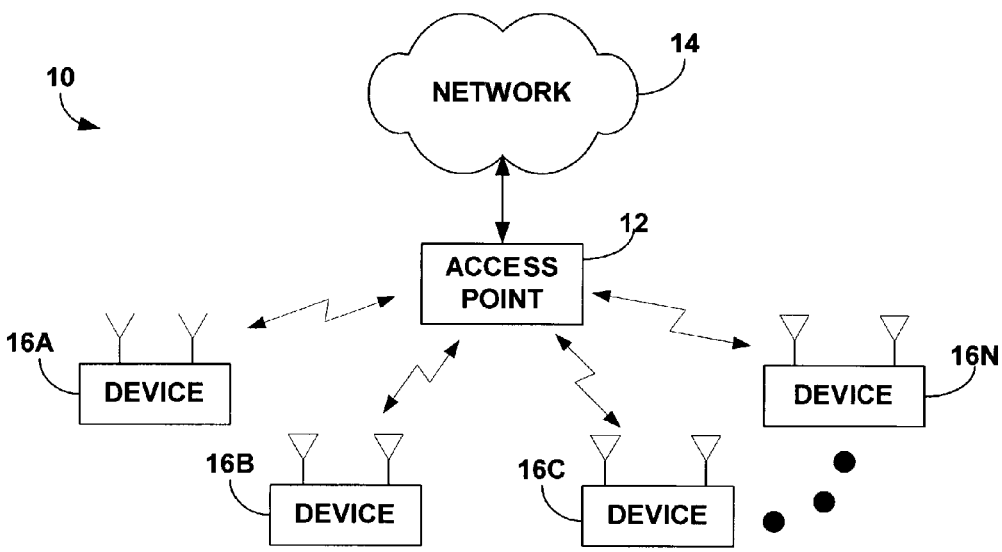
FIG. 1 is a block diagram illustrating a wireless communication network.

FIG. 1 is a block diagram illustrating a wireless communication network 10. Wireless communication network 10 may incorporate multiple receive antennas for receive diversity in accordance with some embodiments of the invention. Receive diversity may be effective in enhancing gain control, signal detection, frame synchronization, and carrier frequency offset (CFO) estimation and correction features associated with a digital front-end provided in wireless communication devices in network 10. As will be explained, a digital front-end constructed in accordance with the invention may be especially useful in multi-carrier wireless systems, such as orthogonal frequency division multiplexing (OFDM) systems, or other systems in which each frame carries a repeated signal pattern. An example of a repeated signal pattern is the preamble of a signal transmitted according to the IEEE 802.11a wireless local area network (WLAN) standard.

As shown in FIG. 1, wireless communication network 10 may include one or more wireless access points 12 coupled to a wired network 14, e.g., via an Ethernet connection. Wireless access point 12 permits wireless communication between wired network 14 and one or more wireless communication devices 16A–16N (hereinafter 16). Each wireless communication device 16, as well as wireless access point 12, may include two or more antennas that provide multiple receive paths for receive diversity, as will be described in further detail herein. Wireless access point 12 may integrate a hub, switch or router to serve multiple wireless communication devices 16. Wireless communication network 10 may be used to communicate data, voice, video and the like between devices 16 and network 14 according to a variety of different wireless transmission standards, e.g., based on a multi-carrier communication technique such as OFDM.

Figure 2:
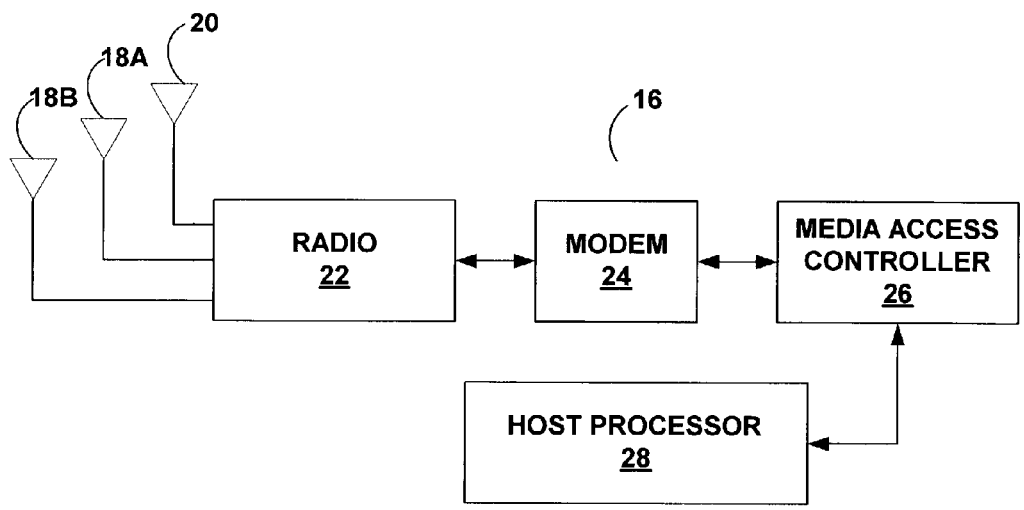
FIG. 2 is a block diagram illustrating a wireless communication device useful in the network of FIG. 1.

FIG. 2 is a block diagram illustrating a wireless communication device 16 in further detail. As shown in FIG. 2, wireless communication device 16 may include one or more radio frequency (RF) antennas 18A, 18B (hereinafter 18), a transmit antenna 20, a radio 22, a modem 24, a media access controller (MAC) 26 and host processor 28. For receive diversity, wireless communication device 16 may include at least two RF antennas 18A, 18B. Radio 22 and modem 24 function together as a wireless receiver. Wireless communication device 16 may take the form of a variety of wireless equipment, such as computers, personal computer cards, e.g., PCI or PCMCIA cards, personal digital assistants (PDAs), network audio or video appliances, and the like.

RF antennas 18 receive RF signals over multiple receive paths. Antenna 18A provides a first receive path 18A, and antenna 18B provides a second receive path. More than two antennas 18 may be provided in some embodiments for enhanced receive diversity. One of antennas 18, or a different antenna 20, may be used for transmission of RF signals within network 10. Radio 22 may include circuitry for upconverting transmitted signals to RF, and downconverting RF signals to baseband. In this sense, radio 22 may integrate both transmit and receive circuitry within a single transceiver component. In some cases, however, transmit and receive circuitry may be formed by separate transmitter and receiver components. For purposes of illustration, discussion herein will be generally limited to the receiver and demodulation aspects of radio 22 and modem 24.

Modem 24 encodes information in a baseband signal for upconversion to the RF band by radio 22 and transmission via a transmit antenna 20. Similarly, and more pertinent to the invention, modem 24 decodes information from RF signals received via antennas 18 and downconverted to baseband by radio 22. As will be described, the RF signals received by multiple antennas 18A, 18B may be demodulated to produce symbol observations that can be combined to form a combined symbol observation for decoding by modem 24. A digital front-end within modem 24 may provide gain control, signal detection, frame synchronization and CFO estimation and correction functions for signals received by wireless communication device 16 via antennas 18. MAC 26 interacts with host processor 28 to facilitate communication between modem 24 and a host wireless communication device 16, e.g., a computer, PDA or the like. Hence, host processor 28 may be a CPU within a computer or some other device. Radio 22, modem 24 and MAC 26 may be integrated on a common integrated circuit chip, or realized by discrete components.

Wireless communication network 10 (FIG. 1) and wireless communication device 16 (FIG. 2) may conform to a wireless networking standard, such as the IEEE 802.11a standard. The IEEE 802.11a standard specifies a format for the radio frequency (RF) transmission of orthogonal frequency division multiplexed (OFDM) data. The OFDM symbols transmitted according to the IEEE 802.11a standard occupy a 20 MHz bandwidth, which is divided into 64 equally spaced frequency bands. Incorporation of multiple antennas 18 for receive diversity in an OFDM wireless communication system, in accordance with the invention, can enhance the performance of gain control, signal detection, frame synchronization and CFO estimation and correction features, particularly when the received signals carry a repeating signal pattern, such as the preamble signal provided by the IEEE 802.11a wireless local area network (WLAN) standard.

Figure 3:
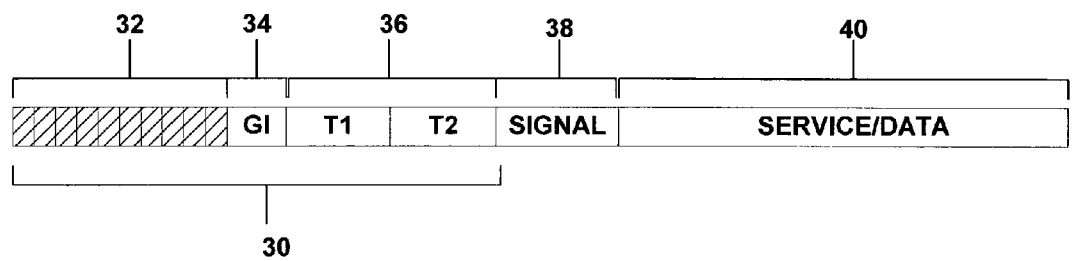
FIG. 3 is a diagram of an OFDM frame transmitted according to the IEEE 802.11a standard.
Figure 4:
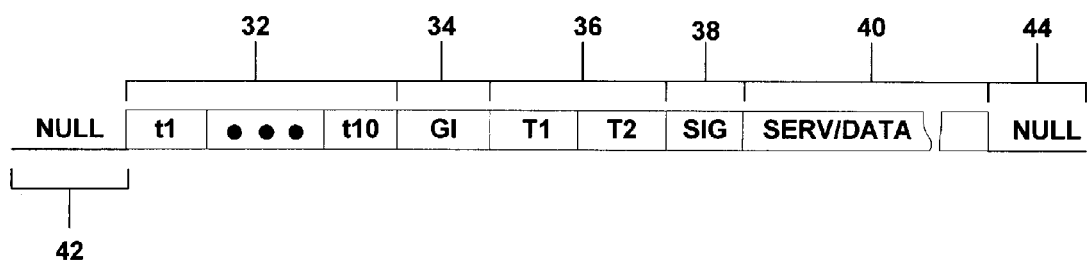
FIG. 4 is another diagram of an OFDM frame, illustrating the start and end of a transmitted frame.

FIG. 3 is a diagram of an OFDM frame, or "packet," transmitted according to the IEEE 802.11a standard. As shown in FIG. 4, the OFDM frame includes a physical layer convergence procedure (PLCP) preamble 30 that contains a short preamble 32, a guard interval 34 and a long preamble 36. The signal structure specified by the IEEE 802.11a standard includes a repeating signal pattern in preamble 30. A signal field 38 follows long preamble 36, and contains a symbol encoding rate and length information for the OFDM frame. Service and data fields (SERVICE/DATA), identified together with reference numeral 40 in FIG. 3, follow signal field 38. The data field contains the data "payload" for the OFDM frame and follows the service field.

Short preamble 32 carries a repetition of 10 short symbols, each of which is 16 samples in length. Long preamble 36 carries two repeated symbols that are each 64 samples in length. Unlike short preamble 32, long preamble 36 is preceded by guard interval 34, which contains a cycle prefix that is 32 samples in length. The cycle prefix is a replica of the last 32 samples of a long symbol from long preamble 36. In general, the techniques described herein for gain control, signal detection, frame synchronization make use of the repeating characteristics of short preamble 32. The CFO estimation and correction technique described herein is applied to both short preamble 32 and long preamble 36. However, the techniques described herein are capable of application to a variety of signals involving a repeating signal pattern, and are not necessarily limited to an 802.11a system, nor even an OFDM system.

FIG. 4 is another diagram of an OFDM frame as shown in FIG. 3, illustrating the start and end of a transmitted frame. Burst communications are characterized by the transmission and reception of data packets or frames separated by a null signal period. Accordingly, as shown in FIG. 4, each OFDM frame is transmitted as a burst and therefore is typically preceded and followed by null signal periods 42, 44, respectively. During null signal periods 42, 44, antennas 18 receives a relatively low power signal characterized by channel noise. As will be described, signal detection techniques typically rely on identification of a transition point between the null signal period 42 and the onset of short preamble 32.

Figure 5:
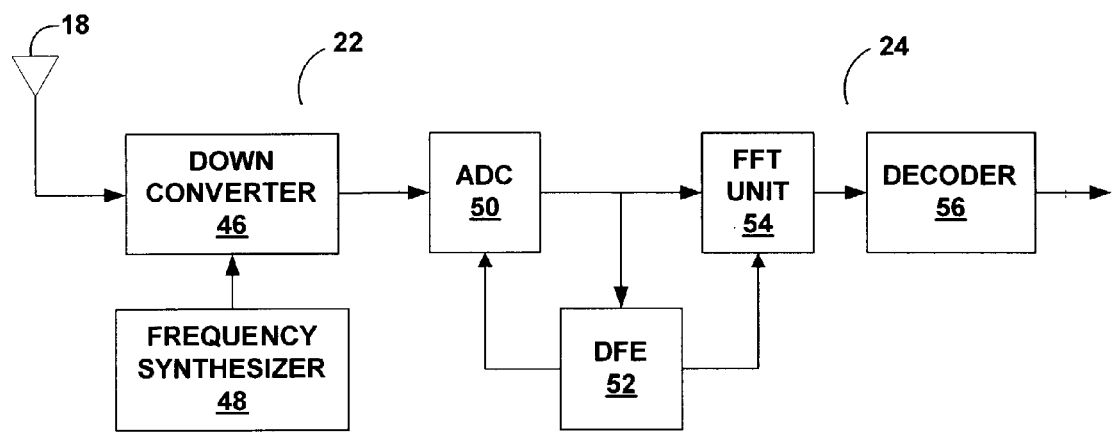
FIG. 5 is a block diagram illustrating radio and modem circuitry within a wireless communication device.

FIG. 5 is a block diagram illustrating radio and modem circuitry within a wireless communication device. As shown in FIG. 5, radio 22 may include a downconverter 46 that receives an RF signal via antenna 18. Downconverter 46 mixes the received RF signal with a signal received from a frequency synthesizer 48 to convert the RF signal down to a baseband frequency. Radio 22 also may include a low noise amplifier and other signal conditioning circuitry (not shown in FIG. 5). Modem 24 may include an analog-to-digital converter (ADC) 50 that produces a digital representation of the baseband signal. ADC 50 may include an amplifier (not shown in FIG. 5) that applies a gain to the analog baseband signal prior to conversion to a digital signal.

A digital front-end (DFE) 52 receives the digital signal from ADC 50 and performs a number of functions, including gain control, signal detection, frame synchronization and CFO estimation and correction. A fast Fourier transform (FFT) unit 54 receives the digital signal from ADC 50 and produces FFT outputs to demodulate the signal. A decoder 56 decodes the FFT outputs to recover the information carried by the received signal. In particular, decoder 56 decodes the information carried by a given tone and produces a stream of serial data for transmission to host processor 28 via MAC 26 (FIG. 2).

In operation, DFE 52 applies control signals to ADC 50 to control the gain of the amplifier associated with or preceding the ADC. In addition, DFE 52 may apply signal detection and frame synchronization signals to the FFT unit 54 to aid in acquisition of the digital signal. DFE 52 also may apply control signals to a CFO correction unit (not shown in FIG. 5) to provide CFO compensation of the digital signal. Modem 24 also may include a channel estimator (not shown) that estimates a complex gain A for a particular frequency bin that corresponds to the transmitted signal information. For purposes of illustration, FIG. 5 shows a single antenna path and associated modem circuitry. However, the structure of FIG. 5 may be readily applied to a multiple antenna arrangement providing receive diversity, as will be described.

Figure 6:
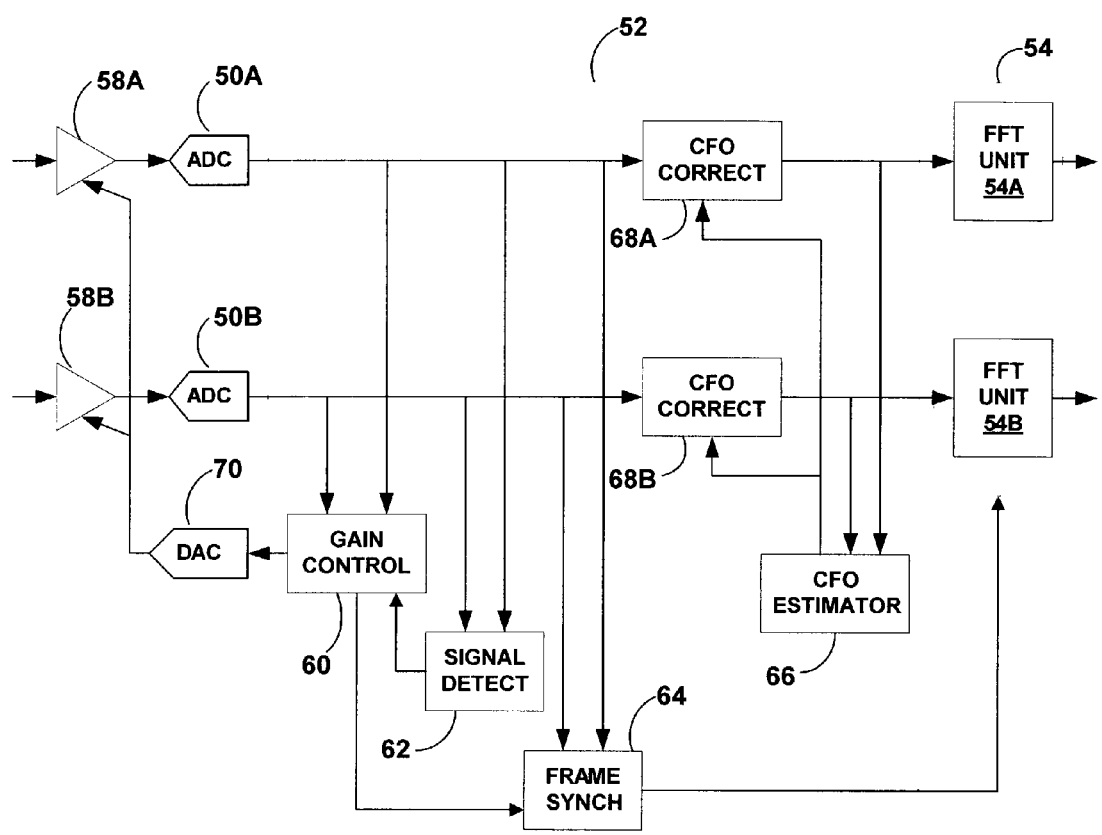
FIG. 6 is a block diagram of a digital front-end for use with a wireless communication device.

FIG. 6 is a block diagram of a digital front-end 52 for use with a wireless communication device. In the example of FIG. 6, amplifiers 58A, 58B amplify baseband signals received from radio 22 with a controllable gain. The signals amplified by amplifiers 58A, 58B are received by different antennas 18A, 18B, providing receive diversity. ADCs 50A, 50B convert the amplified baseband signals to digital representations. DFE 52 includes gain control unit 60, signal detection unit 62 and frame synchronization unit 64. In addition, DFE 52 may include CFO estimator unit 66 and CFO correction units 68A, 68B that compensate the digital signals produced by ADCs 50A, 50B, respectively.

Gain control unit 60 detects the levels of the outputs from ADCs 50A, 50B, respectively, and generates a digital gain control signal. A digital-to-analog converter (DAC) 70 converts the gain control signal to an analog signal that is applied to amplifiers 58A, 58B to selectively control the gain applied to the incoming baseband signals.

Signal detection unit 62 monitors the outputs of ADCs 50A, 50B to detect the arrival of a transmitted signal. In particular, signal detection unit 62 identifies the start of a signal, e.g., an OFDM frame, and generates a control signal indicating signal detection. Signal detection unit 62 applies the signal detection control signal to gain control unit 60, triggering commencement of the gain control operation.

Frame synchronization unit 64 detects the beginning of a transmitted symbol and generates a frame synchronization control signal that is applied to FFT unit 54. In particular, in response to the frame synchronization control signal, FFT unit 54 controls an FFT sampling window associated with FFT sub-units 54A, 54B, which demodulate the signals for the first and second channels, respectively. As will be discussed, frame synchronization unit 64 also may be responsive to gain control unit 60. In particular, the operation of frame synchronization unit 64 may vary depending on the status of the gain applied to the incoming baseband signals.

CFO estimator unit 66 monitors the signals applied to FFT units 54A, 54B to estimate the carrier frequency difference between the transmitter and receiver in each signal. Based on the estimated CFO, CFO estimator 66 generates a control signal that is applied to CFO correction units 68A, 68B. CFO correction units 68A, 68B correct the carrier frequency in the digital signals on an ongoing basis to compensate for the carrier frequency difference in the receiver and thereby enhance the accuracy of the symbols recovered from the signals.

The gain control unit 60, signal detection unit 62, frame synchronization unit 64, CFO estimation unit 66, and CFO correction units 58A, 58B of DFE 52 will now be described in greater detail. Signal detection unit 62, frame synchronization unit 64, CFO estimation unit 66, and CFO correction units 58A, 58B use signals from multiple antenna paths for improved performance.

Figure 7:
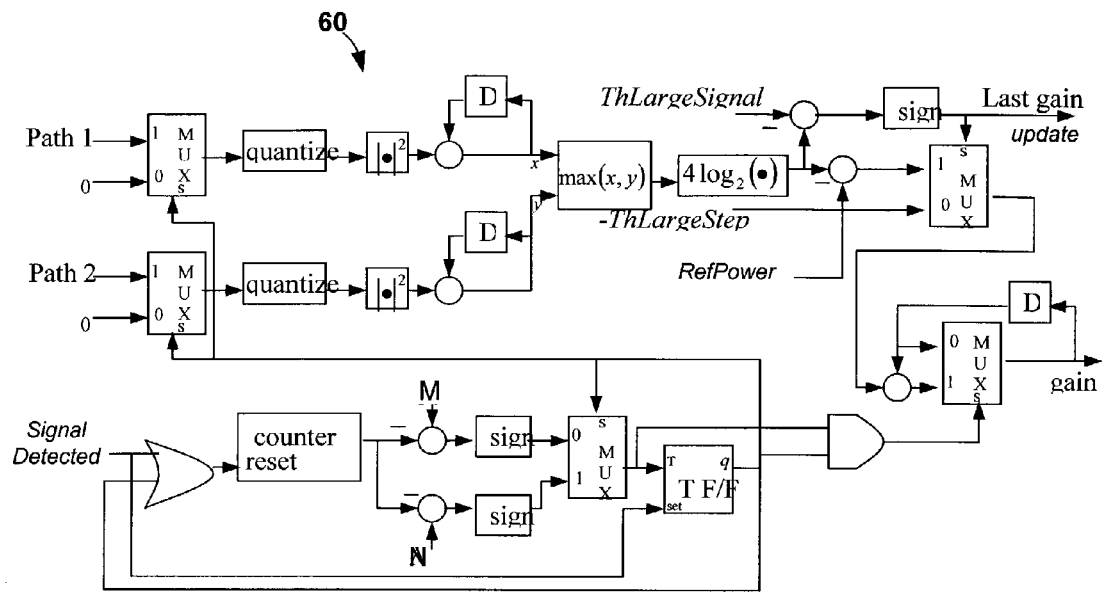
FIG. 7 is a diagram of a gain control unit forming part of the digital front-end of FIG. 6.

FIG. 7 is a diagram of gain control unit 60. In general, gain control unit 60 operates in such a way that the typical assumption of white channel noise used in receiver design need not be disturbed by the gain control. In operation, the arrival of the transmitted signal at the receiver is detected by signal detection unit 62 at the beginning of the short preamble and notified to gain control unit 60 to start the amplifier gain adjustment procedure. By measuring the signal power, the gain of the amplifier is adjusted by gain control unit 60 so that the observed signal power can meet a certain target. Once gain adjustment is finished, the gain will be frozen until the end of the frame. The end of the gain update is notified to the frame synchronization unit 64 so that the input signal to frame synchronization unit 64 can be handled differently for the two time periods—before and after the gain adjustment—as described below.

For a diversity system design, the assumption of the same noise power for different receive paths (corresponding to different antennas 18A, 18B) may result in a reduced complexity solution. For example, if the noise power is the same among different receive paths, the maximum ratio combiner (MRC) for the wireless communication, e.g., OFDM, system can rely on only the estimated channel response rather than estimated signal-to-noise ratio (SNR). Estimating the channel response is much easier and more accurate than estimating the SNR, which needs to account for an estimate of both the channel response and noise power.

A gain control unit 60 as described herein is designed to avoid disturbing, i.e., changing, the relative noise power between the different signal paths received by multiple antennas 18. In this manner, succeeding receiver blocks, such as signal detection unit 62, frame synchronization unit 64, and CFO estimator 66, can be designed under the assumption of identical noise power for all of the different signal paths. Even when noise estimation becomes necessary, gain control unit 60 obviates the need to estimate noise in multiple paths. For example, denoting the sampled and quantized received signal for the i-th signal path observed at j-th clock by $r_{i,j}$, the signal power can be estimated by:

$$P_{i,j} = \frac{1}{N}\sum_{k=0}^{N-1}|r_{i,j-k}|^2, \quad (1)$$

where N is the number of samples used to estimate the signal power. For short preamble 32 shown in FIG. 4, N should be at least 16 to obtain a reliable power estimate.

Accumulation of the magnitude squared samples for power estimation within gain control unit 60 starts after the arrival of the signal, as detected by signal detection unit 62. The accumulation process finishes when the number of accumulated values reaches the prescribed number N. To simplify the hardware necessary to realize gain control unit 60, the input sample can be quantized to the power of 2 value, as shown in FIG. 7, before being used in the power estimation. For a given target signal power RefPower, for example, the gain of the amplifier for the i-th signal path can be represented by:

$$g_{i,j} = \frac{RefPower}{P_{i,j}}. \quad (2)$$

In accordance with the invention, the same gain can be used for each of the amplifiers 58A, 58B for different signal paths so that the relative noise powers between signal paths are not affected by the gain control. To select one gain value for all signal paths, the signal path with the largest measured signal power is used to estimate the signal gain. In particular, the signal gain can be obtained by:

$$g_j = \frac{RefPower}{\max_i P_{i,j}}. \quad (3)$$

Depending on the initial gain setting, multiple gain adjustments may be necessary to arrive at a desirable gain level. As an example, assume that the initial gain is set to a high value at which the weakest signal the receiver can decode reliably is observed with a sufficient precision at the output of one of ADCs 50A, 50B. In this case, the strongest signal the receiver should decode successfully may saturate ADCs 50A, 50B or other circuits in the receiver signal path. If saturation occurs, the measured power for the signal will be smaller than the actual signal power. The gain update based on this measured power will result in a larger gain than the final gain at which the observed signal power is equal to RefPower.

A solution to the saturation issue is to adjust the gain multiple times. When the measured signal power is larger than, i.e., not less than, a certain threshold value, ThLargeSignal, gain control unit 60 may adjust the gain downward in a large step, ThLargeStep. The threshold value ThLargeSignal and the step value ThLargeStep may be programmable. After the gain is updated, the next power estimation for another round of gain adjustment should to be delayed until the signal has settled. If the estimated signal power is still larger than ThLargeSignal, gain control unit 60 may repeat the gain adjustment and power estimation. If the estimated power is smaller than a threshold value ThLargeSignal, the gain is updated as a final adjustment. In this approach, whether the receiver circuit is saturated by the input signal or not is determined by comparing the estimated power with this threshold value ThLargeSignal.

FIG. 7 represents one possible implementation of a gain control unit 60. Accumulation of the magnitude squared samples starts either when the arrival of the signal is detected by signal detection unit 62, or after a finite delay from a previous gain update. A counter circuit counts the accumulated samples The counter circuit is reset to zero when accumulation starts. When the number of accumulated samples reaches the predetermined value N, as shown in FIG. 7, the accumulation process is finished and the gain is updated based on the measured signal power. As shown in FIG. 7, when the counter value reaches N, the counter is reset to zero and counts up until it reaches the value M, which corresponds to the delay required for the signal to be settled down after the gain update.

If the estimated signal power is smaller than ThLargeSignal, as indicated by the adder, gain control unit 60 notifies frame synchronization unit 64 of the end of the gain update routine. If the estimate signal power is not smaller than ThLargeSignal, gain control unit 60 adjusts the gain in a large step, ThLargeStep, and the signal power estimation routine within gain control unit 60 is restarted for another gain update cycle. For example, as shown in the example of FIG. 7, the sign operation on the output of the adder causes the output multiplexer to select the large step gain, ThLargeStep. The calculated gain, i.e., the maximum power level for the two paths, can be converted to a logarithmic value. In this manner, the gain of the amplifier can be compared to the reference power level RefPower and adjusted in a dB-linear fashion. The power level RefPower may be programmable. Quantization blocks convert the respective input values to the nearest power of 2 value. In particular, the output of the quantization block is given by $$q_k = \min_x |r_k - 2^x|^2,$$

where x is an integer. A more accurate estimate of the signal power can be obtained by quantizing the input sample as:

$$q_k = \min_{x,\{a_i\}} \left| r_k - \sum_{i=0}^{Q-1} a_i \cdot 2^{x+i} \right|^2,$$

where $a_i \in \{0,1\}$ and Q is a non-zero integer. The simplest case will be for Q=1. When the input sample is quantized to the nearest power of 2 value (Q=1), the multipliers and squaring operators of FIG. 7 are trivial to implement. This quantization method can be applied to signal detection unit 62 and frame synchronization unit 64 as well.

Figure 8:
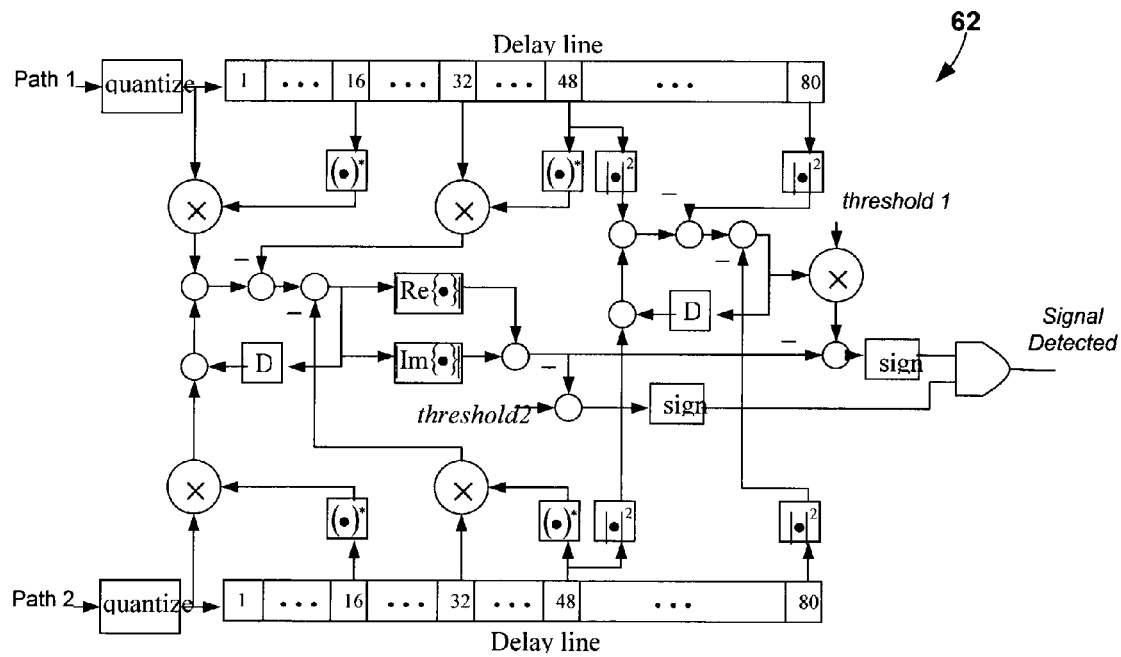
FIG. 8 is a diagram of a signal detection unit forming part of the digital front-end of FIG. 6.

FIG. 8 is a diagram of an exemplary signal detection unit 62. For the short preamble format show in FIG. 3 or 4, signals t1 through t10 are the identical short symbols. Before the arrival of the preamble signal, there is a preceding null signal period during which observation consists of only noise. Denoting the received signal as $r_k$, which can be a sampled and complex valued signal consisting of real and imaginary parts, signal detection unit 62 detects the arrival of a packet if the following condition is satisfied:

$$\frac{\left|\frac{1}{P}\sum_{i=0}^{P-1} r_{k-i} r_{k-i-N}^*\right|}{\frac{1}{M}\sum_{i=0}^{M-1} |r_{k-i-D}|^2} > \text{threshold}, \quad (4)$$

where N is the number of received samples in each short symbol ti, P is an integer value between N and (10-1)N, M is a positive integer, D is a positive integer larger than or equal to 2N, and threshold is a positive value. This threshold value may be programmable. The numerator in expression (4) represents calculation of the signal power using the signal repetition property in the short preamble. The denominator is a delayed version of the signal power estimate.

During the null signal period and beyond the short preamble, the numerator in expression (4) is simply a correlation of two signals, which is typically smaller than the power of the signal, the denominator. On the other hand, at the end of the preamble and for a D larger than or equal to 2N, the numerator and denominator are the power estimates of the preamble signal and noise, respectively. Typically, the signal power is much larger than that of the noise. Consequently, the arrival of the preamble signal can be detected reliably.

To simplify the hardware implementation for signal detection unit 62, expression (4) can be reduced to:

$$\left|\frac{1}{P}\sum_{i=0}^{P-1} r_{k-i} r_{k-i-N}^*\right| > (\text{threshold}) \cdot \frac{1}{M}\sum_{i=0}^{M-1} |r_{k-i-D}|^2. \quad (5)$$

Expression (5) above removes the division operation required in expression (4). The complexity of signal detection unit 62 can be reduced further using the following equation:

$$\left|\text{Re}\left\{\frac{1}{P}\sum_{i=0}^{P-1} r_{k-i} r_{k-i-N}^*\right\}\right| + \left|\text{Im}\left\{\frac{1}{P}\sum_{i=0}^{P-1} r_{k-i} r_{k-i-N}^*\right\}\right| > \quad (6)$$

$$(\text{threshold}) \cdot \frac{1}{M}\sum_{i=0}^{M-1} |r_{k-i-D}|^2.$$

The following relationship holds:

$$1 \leq \frac{\left|\text{Re}\left\{\frac{1}{P}\sum_{i=0}^{P-1} r_{k-i} r_{k-i-N}^*\right\}\right| + \left|\text{Im}\left\{\frac{1}{P}\sum_{i=0}^{P-1} r_{k-i} r_{k-i-N}^*\right\}\right|}{\left|\frac{1}{P}\sum_{i=0}^{P-1} r_{k-i} r_{k-i-N}^*\right|} \leq \sqrt{2} \approx 1.5 \text{ dB}. \quad (7)$$

Therefore, using expression (6) requires an additional 1.5 dB margin in threshold than that in (5). By using expression (6) instead of (5), two squaring operations and one square root calculation can be eliminated, resulting in a significant reduction in hardware complexity.

Existing methods for signal detection generally involve power measurement techniques or correlation-based techniques. According to an existing power measurement technique, the arrival of the packet can be detected by monitoring the power of the received signal. If there is a sudden jump in signal power, the packet arrival is flagged by the existing power management technique. If there is any chance that interference from neighboring channels is received, however, this existing power measurement-based signal detection technique may falsely detect the interference as the arrival of the intended signal.

According to one existing correlation-based technique for signal detection, proposed by T. M. Schmidl and D. C. Cox, "Robust frequency and timing synchronization for OFDM," *IEEE Trans. Commun.* Vol. 45, no. 12, pp. 1613–1621, the following equation can be use for signal detection:

$$\frac{\left|\sum_{i=0}^{N-1} r_{k-i} r_{k-i-N}^*\right|}{\sum_{i=0}^{N-1} |r_{k-i}|^2} > \text{threshold}. \quad (8)$$

During the null signal period and beyond the short preamble period, a signal detection method that makes use of equation (8) may perform comparably with a method that makes use of equation (4), as described herein. At the arrival of the short preamble signal, however, the left hand side of equation (4) results in a much larger value than that of equation (8). In this manner, a signal detection method that relies on equation (4) is superior in sensitivity and resistance to false detection. Another potential drawback of equation (8) relative to equation (4) is observed when the transmitted packet ends. At the end of the packet, the numerator of equation (8) is the correlation output of the transmitted signal, whereas the denominator is the power estimate of the noise. Therefore, the result of equation (8) can be large at the end of the packet, resulting in a false signal detection.

When multiple receive antennas are used, the performance of signal detection unit 62 can improve significantly. The above equations (4)–(7) can be extended to cover multiple receive antenna cases by summing the transmitted signal over multiple receive paths. For example, the signal detect algorithm of equation (5) can be extended to:

$$\left|\sum_{i=1}^{L}\sum_{i=0}^{P-1} r_{k-i} r_{k-i-N}^*\right| > (\text{threshold}) \cdot \sum_{i=1}^{L}\sum_{i=0}^{M-1} |r_{k-i-D}|^2. \quad (5)'$$

for L receive paths corresponding to L antennas. The constants in front of the summations have been lumped into the threshold term in equation (5)' above. The right hand side of equation (5), (6) or (5)' can be modified to choose the maximum of the current term and some threshold term that does not depend on the received samples to provide an extra robustness. According to one embodiment based on this idea, including the extension to cover multiple antennas, the arrival of the signal is detected when the following condition is met:

$$\left| \text{Re}\left( \sum_{i=1}^{L} \sum_{k=0}^{M} r_{i,j-k-16}^* r_{i,j-k} \right) \right| + \left| \text{Im}\left( \sum_{i=1}^{L} \sum_{k=0}^{M} r_{i,j-k-16}^* r_{i,j-k} \right) \right| > \max\left( \text{threshold1} \cdot \sum_{i=1}^{L} \sum_{k=0}^{M} |r_{i,j-k-D}|^2, \text{threshold2} \right) \quad (9)$$

where L is the number of signal paths, M is the number of samples used for signal detection, D is a non-negative integer, and threshold1 and threshold2 are predetermined non-negative values. The values of threshold1 and threshold2 may be programmable. The value 16 in the subscript of equation (4) is attributable to the preamble structure shown in FIGS. 3 and 4. This value can be changed to accommodate a different preamble structure, as desired. If both parameters are set to non-zero values, the signal is detected only when the sum of the correlation is larger than both the delayed power estimate and some predetermined value. In this way, it is possible to prevent false detection due to noise input.

In a digital implementation, due to limited precision, most of the noise samples may be represented as zeros. Occasional non-zero noise samples may cause false detection. By indicating signal detection only when the sum of the correlation is larger than a certain value threshold2, false detections caused by limited precision can be prevented. As an example, FIG. 8 illustrates one possible implementation of signal detector 62. The parameter values for the implementation shown in FIG. 8 are L=2, M=32, and D=48. As in gain control unit 60, illustrated in FIG. 7, the input samples can be quantized to the nearest power of 2 value to reduce hardware complexity. Notably, the use of observation samples from both paths improves the signal detection quality significantly, relative to the case in which only one receive signal is utilized.

Some RF circuit structures or coupling may introduce narrowband interference at DC or the Nyquist frequency. The implementation of signal detection unit 62 in FIG. 8 can operate reliably under this noisy condition by using the threshold1 term in equation (9). An explicit suppression of noise is also possible by applying a bandpass filter to the input signal of the signal detection unit 62. Typically, the subcarriers at the band edge are not used to ease signal filtering. In a system that conforms to the IEEE 802.11a standard, only sixteen subcarriers are transmitted during the short preamble period in which the signal detection unit 62 operates. Due to these unused subcarriers around the DC and band edge, applying a bandpass filter does not degrade the signal detection performance significantly. An example of one simple filter can be $1-D^2$.

Figure 9:
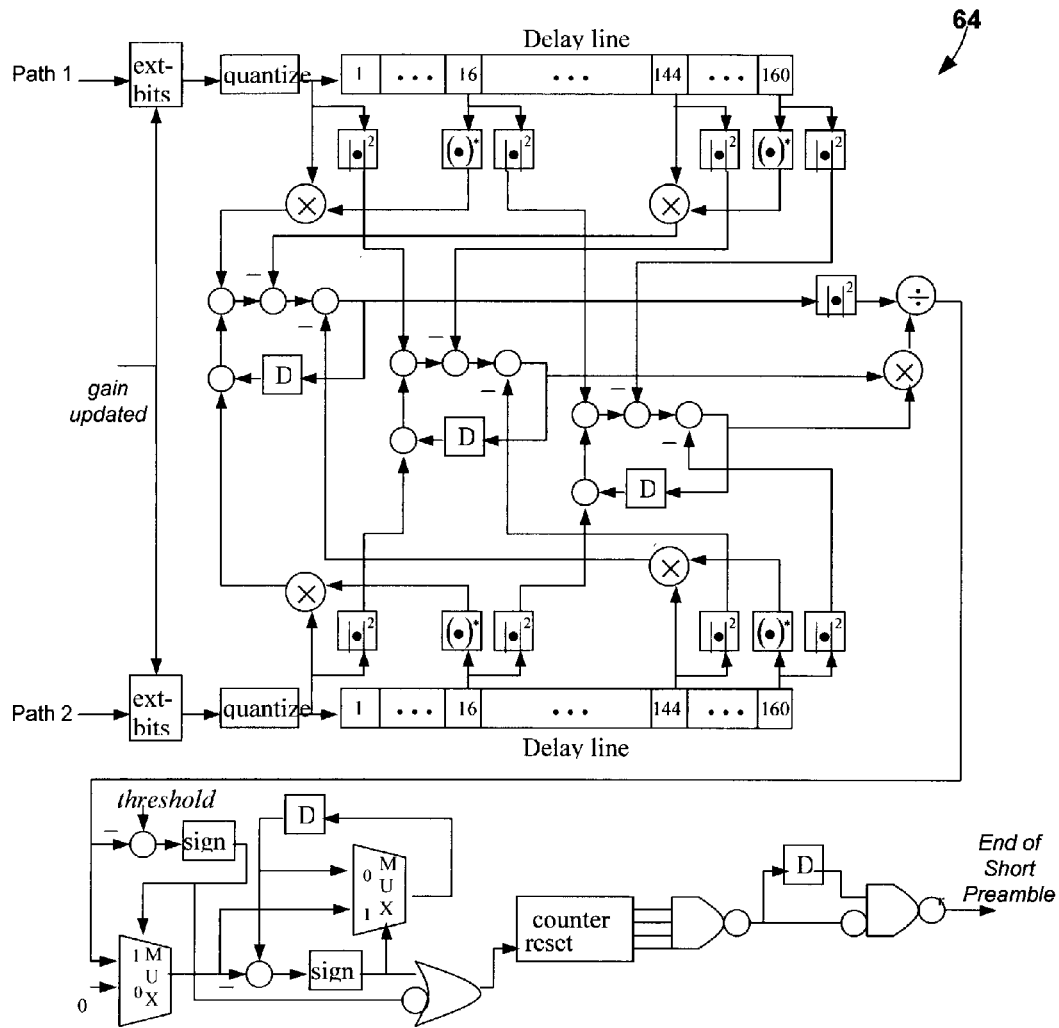
FIG. 9 is a diagram of a frame synchronization unit forming part of the digital front-end of FIG. 6.

FIG. 9 is a diagram of an exemplary frame synchronization unit 64. Using the signal repetition property of the short preamble shown in FIG. 3 or FIG. 4, frame synchronization unit 64 can be configured to search the largest inner product of two normalized signal vectors to locate the end of the short preamble. The first vector consists of 144 consecutive signal observation samples. The other vector a 16-sample delayed version of the first vector. The normalized (or unit) vector is obtained by dividing the vector by its magnitude. When the first vector contains the latter 144 observation samples of the short preamble and, accordingly, the second vector consists of the first 144 observation samples (given 10 symbols×16 samples=160 total samples), the two vectors will be the same under the noiseless condition. The number of samples, i.e., 144 and 16, are specific to this particular example for an IEEE 802.11a frame. Of course, the frame synchronization algorithm described herein can be used with a different set of sample numbers for different applications.

The inner product of the two corresponding unit vectors will be equal to 1. If the two vectors are not the same, the inner product of their unit vectors will always be less than 1. In a multiple receive antenna case, the signal from each single path will preserve the repetition property. Building a large vector by stacking vectors obtained from each signal path, the inner product can still be used for frame synchronization purposes for multiple receive antennas. As the vector size increases, the peak location of the inner product will be more accurate. According to one embodiment, the end of the short preamble shown in FIG. 3 or 4 can be detected by:

$$\operatorname*{argmax}_{j} \frac{\left| \sum_{i=1}^{L} \sum_{k=0}^{143} r_{i,j-k-16}^* r_{i,j-k} \right|^2}{\left( \sum_{i=1}^{L} \sum_{k=0}^{143} |r_{i,j-k-16}|^2 \right)\left( \sum_{i=1}^{L} \sum_{k=0}^{143} |r_{i,j-k}|^2 \right)}. \quad (10)$$

A frame synchronization unit 64 constructed to apply equation (10) uses all samples in the short preamble. Once the arrival of the signal is detected by signal detection unit 62, gain control unit 60 updates the signal gain applied by amplifiers 58A, 58B. A gain update in the middle of the short preamble does not preserve the repeating signal characteristic, which can result in performance degradation of the frame synchronization unit 64. A frame synchronization unit 64 that is robust even during significant signal amplitude fluctuation can be achieved by using only the sign information for those samples observed before the settlement of the signal gain. That is, the $x_{i,j}$ defined as below is used in equation (10) in place of $r_{i,j}$ as follows:

$$x_{i,j} = \begin{cases} \text{RefMag} \cdot (\text{sign}(\text{Re}(r_{i,j})) + \sqrt{-1} \cdot \text{sign}(\text{Im}(r_{i,j}))) & \text{before the gain update is settled down} \\ r_{i,j} & \text{after the gain update is settled down} \end{cases} \quad (11)$$

where RefMag is a predetermined positive value that serves as a reference magnitude. In the transient period during the gain update, the inner product from equation (10) may result in a false peak even with the use of equation (11). By confining the peak search to a certain time period such as some time later after the gain update is settled down, however, the false peak problem can be avoided. Another method is to search the peak only when the calculated inner product is larger than a certain threshold value as implemented in FIG. 8.

When the signal is very large and the proper amplifier gain is not selected yet, some saturated circuits in the signal path may produce meaningless output signals at the beginning of the short preamble. By properly selecting the RefMag value in equation (11), a frame synchronization unit 64 implementing equation (10) works well even in a situation where the repetition property has been destroyed at the beginning. Assume the parameter RefMag is set to a certain value so that the power of $x_{i,j}$ before the gain control is finished is smaller than that of $r_{i,j}$ after the gain control is done. At or near the end of the short preamble, the signal sample entering in the first vector as a new element will be the repeated version of the previous one 16 samples back.

As the end of the short preamble approaches, the inner product according to equation (10) increases because of the arrival of this new repeated signal. Once the end of the short preamble is passed, the power of the oldest sample leaving the vector is smaller than the new incoming sample. Then, the inner product of these newly formed unit vectors is smaller than that obtained for the previous vectors. As time progresses, large powered signals enter the vector while small powered signals leave the vector. As a result, the inner product will become progressively smaller. Thus, a unique peak in the inner product can be located at the end of the short preamble even when the repetition property has been compromised at the beginning.

Again, FIG. 9 shows an example implementation of a frame synchronization unit 64. The number of signal paths in the example of FIG. 9 is L=2. In this implementation, the maximum search of the ratio of equation (10) is conducted only when the ratio is larger than a certain threshold value, which may be programmable. The peak location of the ratio, which is at the end of the short preamble, is released when the maximum value is not updated for a prescribed period of time. A counter is used to measure this time period. The counter is reset to a zero value either when a new maximum value is found or when the ratio is smaller than the threshold. The 'ext-bits' blocks in FIG. 9 each represent the implementation of equation (11). The input sample is quantized to the nearest power of 2 value. When there are multiple receive antennas, the technique represented by equations (10) and (11) provides a considerable performance improvement over the case where only one signal path is utilized in frame synchronization.

The performance of frame synchronization unit 64 of FIG. 9 can be degraded by a correlated noise such as narrowband interference. For this reason, a bandpass filter as described above with respect to signal detection unit 62 can also be applied in frame synchronization unit 64 to suppress narrowband interferences at DC and Nyquist frequency.

Figure 10:
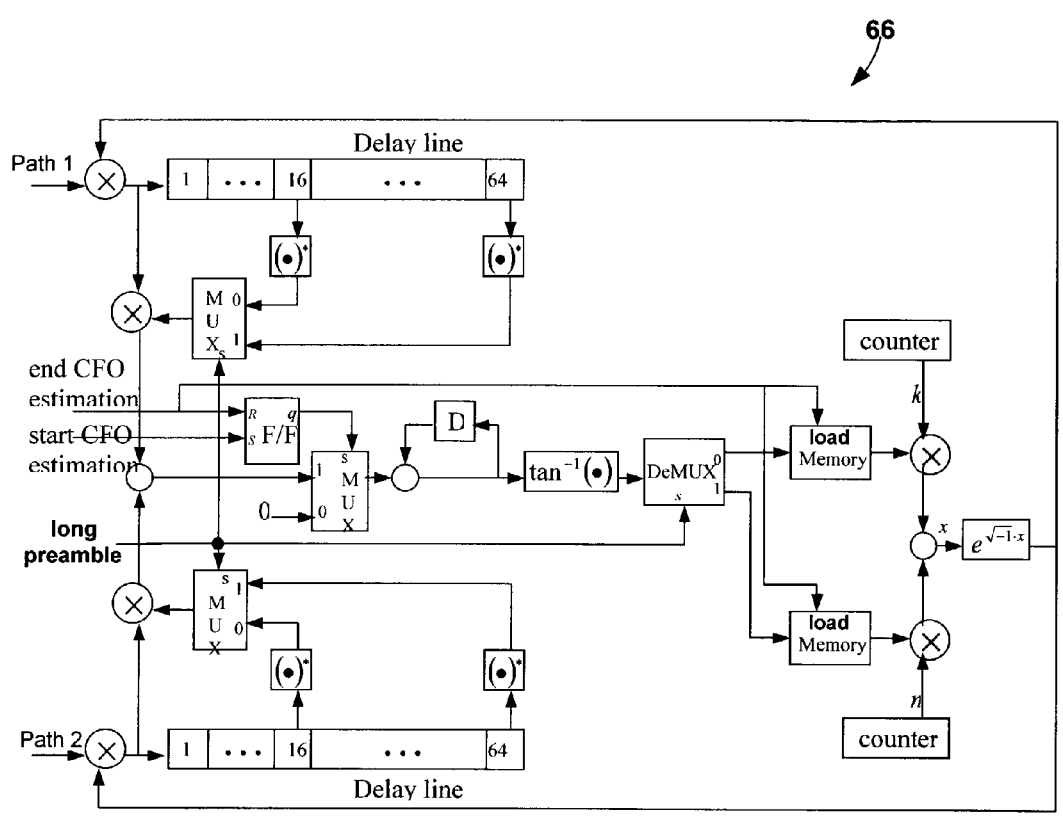
FIG. 10 is a diagram of a carrier frequency offset (CFO) estimation and correction circuit forming part of the digital front-end of FIG. 6.

FIG. 10 is a diagram of combined carrier frequency offset (CFO) estimation and correction unit 66, 68. When the carrier frequency of the receiver is different from that of the transmitter, the received sample is represented as $$r_{i,k}=s_{i,k}\cdot e^{\sqrt{-1}2\pi k\Delta f_c T}, \quad (12)$$

where $s_{i,j}$ is the ideally demodulated sample with the perfectly matched carrier frequency, $\Delta f_c$ is the carrier frequency offset (CFO) between the transmitter and receiver, and T is the sampling period. The carrier frequency offset $2\pi\cdot\Delta f_c\cdot T$ can be denoted as $\Delta w_c$. Under the noiseless condition, a sample $r_{i,k}$ in the short preamble from short preamble symbols t2 to t10 is related to the previous sample $r_{i,k-16}$ as $$r_{i,k}=r_{i,k-16}e^{\sqrt{-1}16\Delta w_c}. \quad (13)$$

Multiplying both sides of equation (13) by $r_{i,k-16}{}^*$ results in:

$$r_{i,k-16}^* \cdot r_{i,k} = |r_{i,k-16}|^2 e^{\sqrt{-1}\,16\Delta w_c}. \quad (14)$$

Then, the estimate of the carrier frequency offset (CFO) can be obtained as:

$$\Delta \varpi_{c,i} = \frac{1}{16}\text{angle}\{r_{i,k-16}^* r_{i,k}\}. \quad (15)$$

Averaging the correlation output throughout the short preamble, the more accurate estimate can be obtained as:

$$\Delta \varpi_{c,i} = \frac{1}{16}\text{angle}\left\{\sum_{k=0}^{K-1} r_{i,j-k-16}^* r_{i,j-k}\right\}. \quad (16)$$

The averaging is applied to the correlation outputs before the angle operation so that the larger signal can be treated with a larger significance. It is possible to perform the angle operation on the individual sample products and then perform averaging on the angles. This approach can result in lower hardware complexity, perhaps at the expense of some performance loss.

The typical transmitter and receiver derive their clocks from a single source respectively. As a result, demodulated signals from different antennas suffer from the same amount of carrier frequency offset relative to the transmitter frequency. Averaging the correlation over the different signal paths, this carrier frequency offset can be estimated by $$\Delta \varpi_c = \frac{1}{16}\text{angle}\left\{\sum_{i=1}^{L}\sum_{k=0}^{K-1} r_{i,j-k-16}^* r_{i,j-k}\right\}, \quad (17)$$

where j is the time index corresponding to the end of the short preamble detected by the frame synchronization unit 64 and K is the number of samples used for CFO estimation determined such that at the time j−K+1−16, the received signal is settled down after application of gain control unit 60 to adjust signal gain. In other words, the CFO estimation (12) starts 16 samples after the gain control routine is settled down and ends at the end of the short preamble flagged by the frame synchronization unit 64. At that point, CFO estimator unit 66 uses only those samples with a sufficient precision observed after the gain control is finished.

The estimated CFO using the short preamble is compensated from the beginning of the long preamble by the time-varying phase term as $$y_{i,k}=r_{i,k}e^{-\sqrt{-1}\Delta\varpi_c k}, \quad (18)$$

where $y_{i,k}$ is the CFO compensated received sample for the ith antenna and at time k. For this relationship, it is assumed that the time index k restarts from zero when the CFO correction is applied.

Any residual CFO after this correction can be estimated by using the repeated long preamble, and corrected from the end of the long preamble. Following the same derivation steps as in the short preamble, CFO estimator unit 66, by using the long preamble, can have the same form as:

$$\Delta \varpi_f = \frac{1}{64} \text{angle} \left\{ \sum_{i=1}^{L} \sum_{k=0}^{K-1} r^*_{i,j-k-64} r_{i,j-k} \right\}, \quad (19)$$

where j is the time index of the end of the long preamble and K=64, reflecting the number of samples in the long symbol. In calculation of the CFO in the form of equations (17) and (19), the longer time that the correlated samples are separated, the more accurate the CFO estimate will be. In most cases, the CFO estimate of equation (19) will be more accurate than that of equation (17). Applying CFO correction one more time will reduce the final CFO. The CFO correction from the end of the long preamble will have the form:

$$y_{i,k} = r_{i,k} e^{-\sqrt{-1}(\Delta \overline{w}_c k + \Delta \overline{w}_f u(k-n-64)(k-n))}, \quad (20)$$

where n is the time index of the first sample in the second long symbol T2 and u(k−n−64) is the unit step function (1 for k≥n+64, zero otherwise). It can be seen that correction of the second CFO term estimated in equation (19) starts at the end of second long preamble symbol T2 with the initial phase of $64 \cdot \Delta \overline{w}_f$ which is the phase rotation during the second long preamble symbol T2 due to the residual CFO of $\Delta \overline{w}_f$. In the application of the IEEE 802.11a standard, the long preamble is also used for channel estimation in which any phase rotation is accounted for as part of the channel response. The phase error due to the residual CFO during the long preamble becomes part of the channel response after the channel estimation. By correcting the second CFO component from the end of the long preamble with an initial phase corresponding to the accumulated phase error during the second long preamble symbol T2, the phase error in the signal and data symbols can be minimized. An implementation example of this CFO estimation and correction device is shown in FIG. 10.

Figure 11:
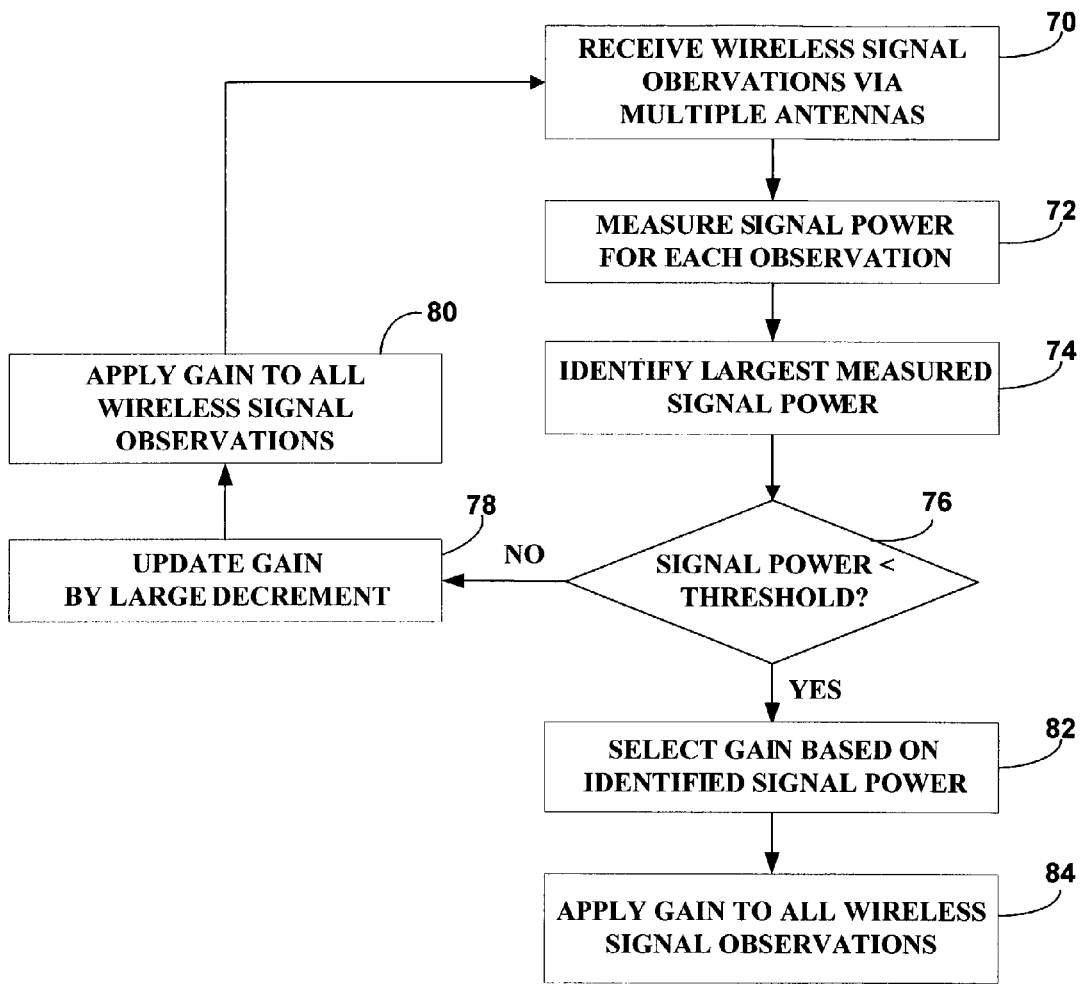
FIG. 11 is a flow diagram illustrating a gain control technique.

FIG. 11 is a flow diagram illustrating a gain control technique. The gain control technique may be implemented within a gain control unit 60 as described herein. As shown in FIG. 11, gain control unit 60 receives observations of a wireless signal via multiple antennas (70), thereby making use of receive diversity for purposes of gain control. Gain control unit 60 then measures the signal power for each signal (72), and identifies the largest measured signal power (74) among the multiple observations.

If the largest measured signal power is not less than a threshold (76), i.e., ThLargeSignal, gain control unit 60 updates the gain by a large decrement (78), i.e., ThLargeStep. Gain control unit 60 applies the resulting gain to all of the wireless signal observations (80), i.e., the signals received on all of the multiple antennas. Gain control unit 60 then initiates another measurement and comparison cycle (70, 72, 74, 76). If the largest measured signal power is less than the threshold (76), gain control unit 60 selects a gain based on the identified largest measured signal power (82), and applies the gain to all of the observations (84). This gain applied in step (84) serves as the final gain and is frozen for the remainder of the packet. For the next packet, gain control unit 60 restarts the measurement process.

Figure 12:
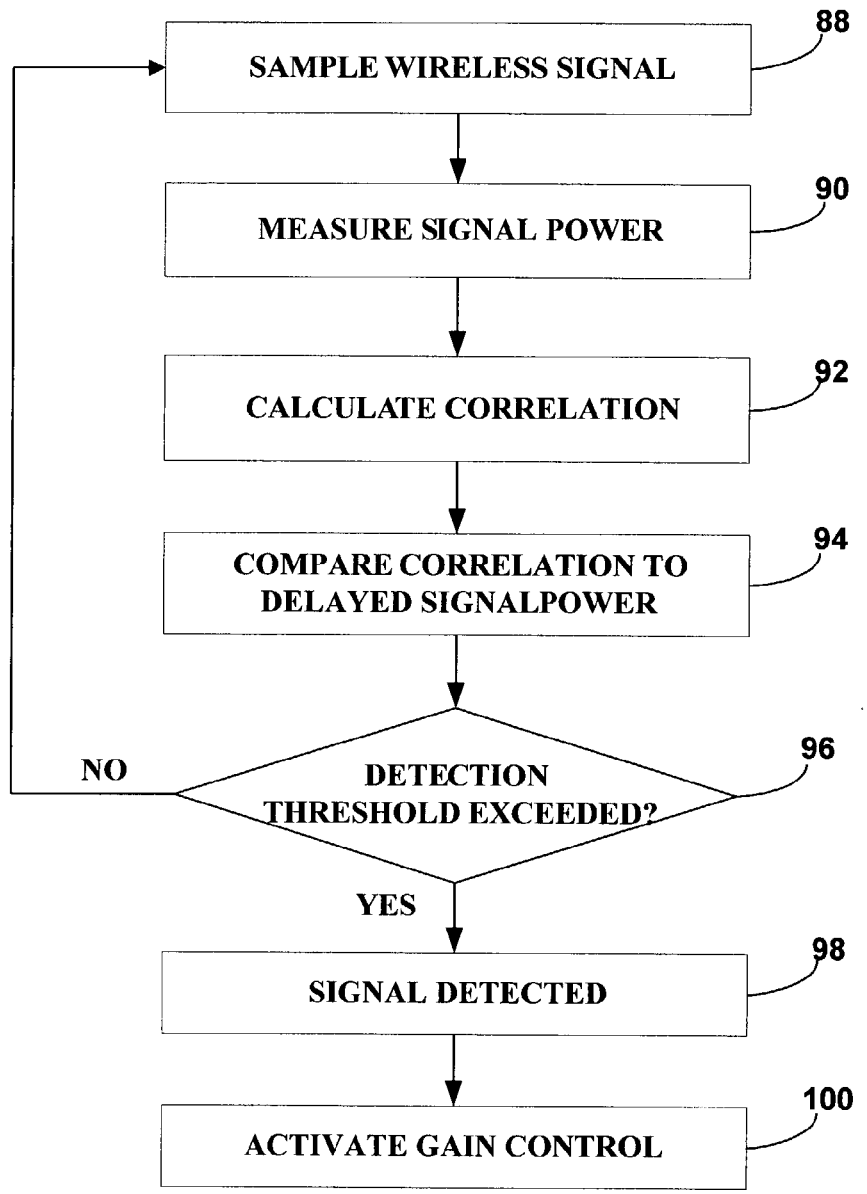
FIG. 12 is a flow diagram illustrating a signal detection technique.

FIG. 12 is a flow diagram illustrating a signal detection technique, which may be implemented within signal detection unit 62 as described herein. As shown in FIG. 12, signal detection unit 62 samples one or more wireless signals (88) received via an antenna 18 or multiple antennas. In general, sampling of multiple signals received via a receive diversity antenna arrangement will be desirable. Upon measurement of the signal power of the wireless signal(s) (90), signal detection unit 62 calculates a correlation (92) as described previously, e.g., with respect to equations (4), (5), (6) and (5)'.

Signal detection unit 62 then compares the correlation to a delayed signal power measurement (94) of the wireless signal(s). For example, the numerator in expression (4) represents calculation of the signal power using the signal repetition property in the short preamble, whereas the denominator is a delayed version of the signal power estimate. In some embodiments, the comparison may produce a ratio. Based on the comparison, signal detection unit 62 determines whether a detection threshold has been exceeded (96). If so, signal detection unit 62 generates a control signal that indicates that a signal has been detected (98), and transmits the control signal to gain control unit 60 to activate the gain control routine (100). If not, signal detection unit 62 continues to monitor the incoming wireless signal observations to detect a signal.

Figure 13:
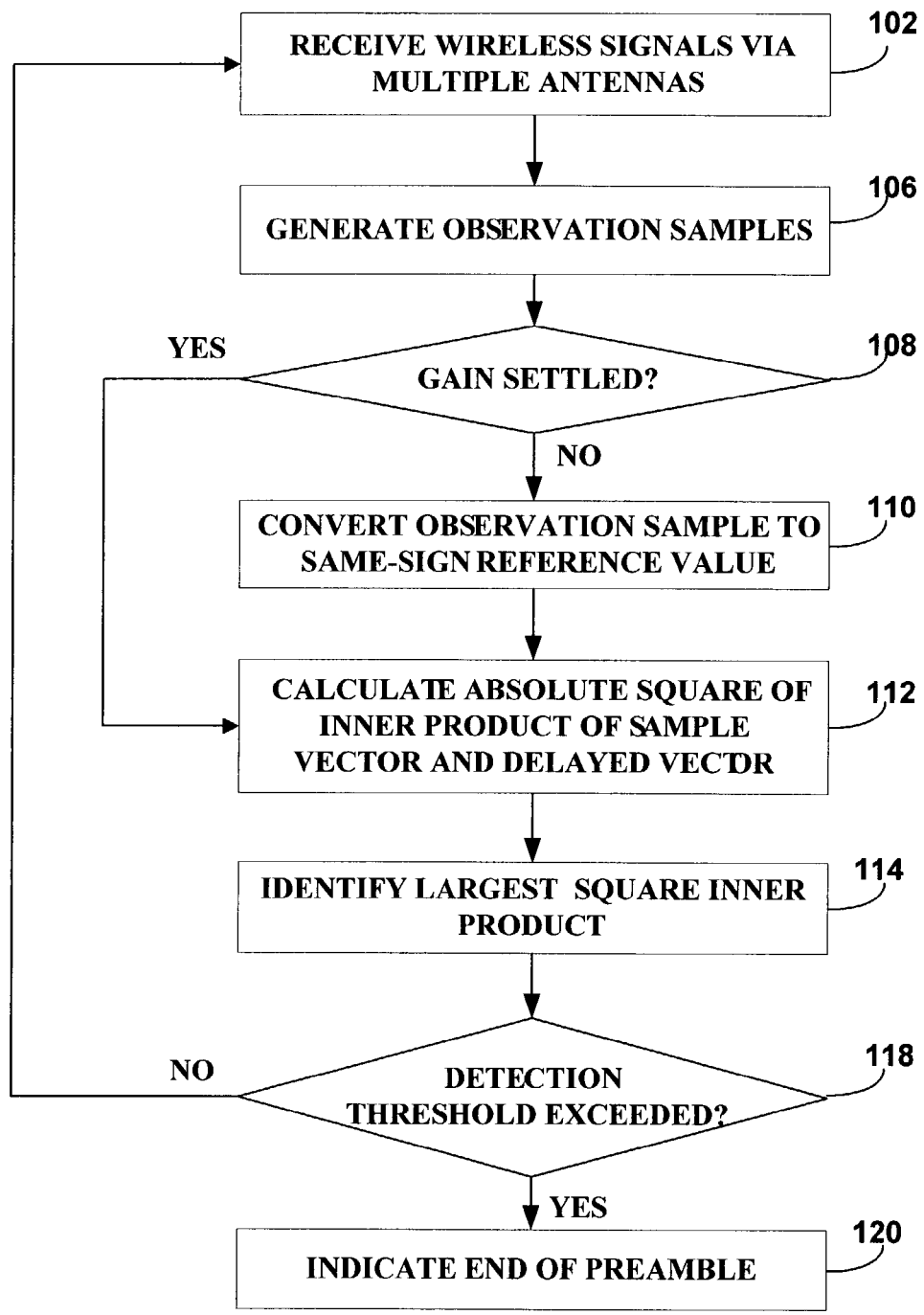
FIG. 13 is a flow diagram illustrating a frame synchronization technique.

FIG. 13 is a flow diagram illustrating a frame synchronization technique, which may be implemented within a frame synchronization unit 64 as described herein. As shown in FIG. 13, frame synchronization unit 64 receives wireless signals via multiple antennas (102), and generates observation samples (106). The observation samples represent samples within the short preamble symbol of the relevant packet. Frame synchronization unit 64 uses the observation samples to identify the beginning and end of the data portion of the packet. However, the manner in which frame synchronization unit 64 processes the observation samples varies according to the gain control routine.

If the gain applied to the incoming signal is settled (108), frame synchronization unit 64 calculates the absolute square of the inner product of a sample vector and a delayed vector (112). If the gain is not yet settled, however, frame synchronization unit 64 first converts the observation samples to a same-sign reference value (110), as described in equation (11) above, before calculating the inner product. In either case, frame synchronization unit 64 then identifies the largest absolute square inner product (114), i.e., the peak. If the result of the peak exceeds an applicable detection threshold (118), frame synchronization unit 64 indicates the end of the short preamble (120). If the result does not exceed the detection threshold, frame synchronization unit 64 returns to process additional samples and thereby identify the end of the short preamble.

Figure 14:
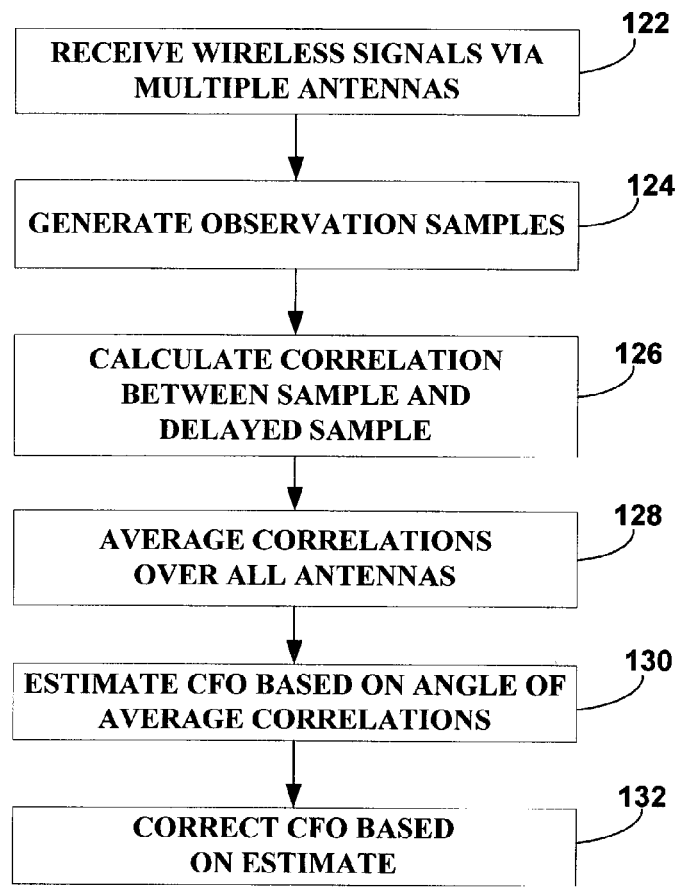
FIG. 14 is a flow diagram illustrating a CFO estimation and correction technique.

FIG. 14 is a flow diagram illustrating a CFO estimation and correction technique, which may be implemented with a CFO estimator unit 66 and CFO correction unit 68 as described herein. As shown in FIG. 14, CFO estimator unit 66 receives wireless signals via multiple antennas (122). Upon generating observation samples for the wireless signals (124), CFO estimator unit 66 calculates a correlation between the observation samples and a delayed version of the observation samples (126). CFO estimator unit 66 then averages the correlations over all of the antennas (128), and estimates a CFO based on the angle of the averaged correlations (130). On this basis, CFO correction unit 68 applies a correction to each signal path that corrects the CFO (132).

The various components described herein for gain control, signal detection, frame synchronization and carrier frequency offset estimation and correction may be formed by a variety of hardware components such as integrated logic circuitry, e.g., an Application Specific Integrated Circuit (ASIC), programmable logic devices, microprocessors, and the like. For size and complexity reasons, it may be desirable that the various components be formed together within a common hardware device such as an ASIC.

Various embodiments of the invention have been described. These and other embodiments are within the scope of the following claims.

The invention claimed is:

1. A method comprising:
    receiving observations of a wireless signal via multiple antennas;
    measuring power levels of the observations by averaging a number of absolute squared samples of each of the observations;
    identifying a largest power level among the measured power levels;
    selecting an amplifier gain based on the largest measured power level; and
    applying the amplifier gain to each of the observations.

2. The method of claim 1, further comprising:
    determining whether the largest power level exceeds a threshold; and
    decreasing the amplifier gain in a series of fixed increments until the largest power level does not exceed the threshold.

3. The method of claim 2, further comprising, upon determining that the largest power level does not exceed the threshold, adjusting the amplifier gain so that the largest power level is substantially equal to a reference power level.

4. The method of claim 2, further comprising:
    measuring the largest power level upon elapse of a delay period following each of the incremental decreases in the amplifier gain; and
    repeating the determination of whether the largest power level exceeds the threshold following each of the measurements.

5. The method of claim 4, wherein the threshold, the fixed increments, and the delay period are programmable.

6. The method of claim 2, wherein the threshold and the fixed increments are programmable.

7. The method of claim 1, further comprising:
    detecting the wireless signal; and
    measuring power levels of the observations only after elapse of a time delay following detection of the wireless signal.

8. The method of claim 1, further comprising quantizing each of the observations to the nearest power of 2 value.

9. The method of claim 1, wherein the wireless signal is transmitted according to the IEEE 802.11a standard.

10. The method of claim 1, further comprising filtering the observations.

11. The method of claim 1, further comprising filtering each of the observations with a filter transfer function of $1-D^2$.

12. The method of claim 1, further comprising filtering each of the observations with a filter transfer function of $1-D$.

13. The method of claim 1, further comprising filtering each of the observations with a filter transfer function of $1+D$.

14. A method comprising:
    receiving observations of a wireless signal via multiple antennas;
    measuring power levels of the observations;
    generating a correlation of the observations;
    indicating a signal detection based on the correlation and a delayed version of the measured power levels;
    identifying a largest power level among the measured power levels;
    selecting an amplifier gain based on the largest measured power level; and
    applying the amplifier gain to each of the observations.

15. The method of claim 14, further comprising measuring the power levels by averaging absolute squared samples of the observations for multiple antennas during a time period.

16. The method of claim 14, further comprising:
    multiplying an observation sample from each of the antennas with the complex conjugate of a delayed observation sample from the respective antenna;
    calculating an average of the multiplication products over all of the antennas during a time period; and
    calculating the correlation by generating the absolute value of the calculated average.

17. The method of claim 16, wherein generating the absolute value of the calculated average includes summing the absolute values of real and imaginary components of each of the multiplication products.

18. The method of claim 14, further comprising indicating the signal detection when the correlation is larger than a threshold value.

19. The method of claim 14, further comprising indicating the signal detection when the correlation is larger than the delayed version of one of the measured power levels multiplied by a threshold factor.

20. The method of claim 14, further comprising indicating the signal detection when the correlation is larger than both a threshold value and the delayed version of one of the measured power levels multiplied by a threshold factor.

21. The method of claim 20, wherein the threshold value and the threshold factor are programmable.

22. The method of claim 14, further comprising quantizing each of the observations to the nearest power of 2 value before measuring the power levels and calculating the correlation.

23. The method of claim 14, further comprising filtering each of the observations before measuring the power levels and calculating the correlation.

24. The method of claim 23, further comprising filtering each of the observations with a filter transfer function of $1-D^2$.

25. The method of claim 23, further comprising filtering each of the observations with a filter transfer function of $1-D$.

26. The method of claim 23, further comprising filtering each of the observations with a filter transfer function of $1+D$.

27. A method comprising:
    receiving observations of a wireless signal via multiple antennas;
    calculating an absolute squared value of an inner product between a unit vector of observation samples from the antennas and a time delayed unit vector of observation samples from the antennas;

identifying a largest absolute squared inner product value among the calculated absolute squared inner product values;
measuring power levels of the observations;
identifying a largest power level among the measured power levels;
selecting an amplifier gain based on the largest measured power level; and
applying the amplifier gain to each of the observations.

28. The method of claim 27, further comprising adjusting the gain of the observation samples, and fixing the gain at a constant value of the observation samples upon satisfaction of a criterion.

29. The method of claim 28, further comprising:
converting each component of an observation sample to a sign magnitude value having a sign that is the same as the sign of the observation sample but a magnitude that is a fixed magnitude value while the gain varies;
using the sign magnitude value as a vector element for the inner product calculation while the gain is adjusted; and
using the observation sample as a vector element for the inner product calculation after the gain has been fixed at the constant value.

30. The method of claim 29, wherein the fixed magnitude value is programmable.

31. The method of claim 27, further comprising identifying the largest absolute squared inner product value when the largest absolute squared inner product value is larger than a threshold.

32. The method of claim 31, wherein the threshold is programmable.

33. The method of claim 27, further comprising:
comparing a current absolute squared inner product value with the largest absolute squared inner product value;
storing the larger of the compared absolute squared inner product values; and
identifying the stored absolute squared inner product value as the largest absolute squared inner product value if a previously identified absolute squared inner product value was identified more than a time period previously.

34. The methods of claim 33, wherein the time period is programmable.

35. The method of claim 27, further comprising quantizing the observation samples to the nearest power of 2 value before using the observation samples in one of the vectors.

36. A method comprising:
receiving observations of a wireless signal via multiple antennas;
generating a correlation of the observations for each of the antennas;
averaging the correlations over all of the antennas;
estimating a carrier frequency offset based on the angle of the averaged correlations;
measuring power levels of the observations;
identifying a largest power level among the measured power levels;
selecting an amplifier gain based on the largest measured power level; and
applying the amplifier gain to each of the observations.

37. The method of claim 36, further comprising generating the correlation by multiplying a current observation sample and the complex conjugate of a delayed version of the observation sample.

38. The method of claim 36, further comprising correcting the carrier frequency offset for subsequent observation samples based on the estimated carrier frequency offset.

39. The method of claim 36, wherein the wireless signal is transmitted according to the IEEE 802.11a standard, and wherein the wireless signal includes a short preamble and a long preamble, the method further comprising:
estimating the carrier frequency offset using the short preamble; and
correcting the carrier frequency offset from the long preamble.

40. The method of claim 39, further comprising:
re-estimating the carrier frequency offset using the corrected long preamble; and
correcting the carrier frequency offset in the wireless signal following the end of the long preamble based on the re-estimated carrier frequency offset.

41. The method of claim 40, further comprising adding an offset value to the correction of the carrier frequency offset following the end of the long preamble.

42. The method of claim 40, further comprising:
adjusting the amplifier gain applied to each of the observations at the beginning of the short preamble; and
estimating the carrier frequency offset using the short preamble after the amplifier gain adjustment.

43. A wireless receiver comprising:
multiple antennas that receive observations of a wireless signal;
a gain control unit that measures power levels of the observations by averaging a number of absolute squared samples of each of the observations, identifies a largest power level among the measured power levels, and selects an amplifier gain based on the largest measured power level; and
an amplifier that applies the amplifier gain to each of the observations.

44. The receiver of claim 43, wherein the gain control unit determines whether the largest power level exceeds a threshold, and decreases the amplifier gain in a series of fixed increments until the largest power level does not exceed the threshold.

45. The receiver of claim 44, further comprising, upon determining that the largest power level does not exceed the threshold, adjusting the amplifier gain so that the largest power level is substantially equal to a reference power level.

46. The receiver of claim 44, wherein the gain control unit measures the largest power level upon elapse of a delay period following each of the incremental decreases in the amplifier gain, and repeats the determination of whether the largest power level exceeds the threshold following each of the measurements.

47. The receiver of claim 46, wherein the threshold, the fixed increments, and the delay period are programmable.

48. The receiver of claim 44, wherein the threshold and the fixed increments are programmable.

49. The receiver of claim 43, further comprising a signal detection unit that detects the wireless signal, wherein the gain control unit measures power levels of the observations only after elapse of a time delay following detection of the wireless signal.

50. The receiver of claim 43, wherein the gain control unit quantizes each of the observations to the nearest power of 2 value.

51. The receiver of claim 43, wherein the wireless signal is transmitted according to the IEEE 802.11a standard.

52. The receiver of claim 43, further comprising a filter that filters the observations.

53. The receiver of claim 43, further comprising a filter that filters the observations with a filter transfer function of $1-D^2$.

54. The receiver of claim 43, further comprising a filter that filters the observations with a filter transfer function of 1−D.

55. The receiver of claim 43, further comprising a filter that filters the observations with a filter transfer function of 1+D.

56. A receiver comprising:
multiple antennas that receive observations of a wireless signal;
a gain control unit that measures power levels of the observations, identifies a largest power level among the measured power levels, and selects an amplifier gain based on the largest measured power level;
a signal detection unit that generates a correlation of the observations, and indicates a signal detection based on the correlation and a delayed version of the measured power level; and
an amplifier that applies the amplifier gain to each of the observations.

57. The receiver of claim 56, further comprising a power control unit that measures the power level by averaging absolute squared samples of the observations for multiple antennas during a time period.

58. The receiver of claim 56, wherein the signal detection unit multiplies an observation sample from each of the antennas with the complex conjugate of a delayed observation sample from the respective antenna, calculates an average of the multiplication products over all of the antennas during a time period, and calculates the correlation by generating the absolute value of the calculated average.

59. The receiver of claim 58, wherein the signal detection unit generates the absolute value of the calculated average by summing the absolute values of real and imaginary components of each of the multiplication products.

60. The receiver of claim 58, wherein the signal detection unit indicates the signal detection when the correlation is larger than a threshold value.

61. The receiver of claim 56, wherein the signal detection unit indicates the signal detection when the correlation is larger than the delayed version of the measured power level multiplied by a threshold factor.

62. The receiver of claim 56, wherein the signal detection unit indicates the signal detection when the correlation is larger than both a threshold value and the delayed version of the measured power level multiplied by a threshold factor.

63. The receiver of claim 62, wherein the threshold value and the threshold factor are programmable.

64. The receiver of claim 56, further comprising a quantizer that quantizes each of the observations to the nearest power of 2 value before the power level is measured and the correlation is calculated.

65. The receiver of claim 56, further comprising a filter that filters each of the observations before the power level is measured and the correlation is calculated.

66. The receiver of claim 65, wherein the filter has a filter transfer function of $1-D^2$.

67. The receiver of claim 65, wherein the filter has a filter transfer function of 1−D.

68. The receiver of claim 65, wherein the filter has a filter transfer function of 1+D.

69. A receiver comprising:
multiple antennas that receive observations of a wireless signal;
a frame synchronization unit that calculates an absolute squared value of an inner product between a unit vector of observation samples from the antennas and a time delayed unit vector of observation samples from the antennas, and identifies a largest absolute squared inner product value among the calculated absolute squared inner product values;
a gain control unit that measures power levels of the observations, identifies a largest power level among the measured power levels, and selects an amplifier gain based on the largest measured power level; and
an amplifier that applies the amplifier gain to each of the observations.

70. The receiver of claim 69, wherein the gain control unit fixes the gain at a constant value of the observation samples upon satisfaction of a criterion.

71. The receiver of claim 70, wherein the frame synchronization unit converts each component of an observation sample to a sign magnitude value having a sign that is the same as the sign of the observation sample but a magnitude that is a fixed magnitude value while the gain varies, uses the sign magnitude value as a vector element for the inner product calculation while the gain is adjusted, and uses the observation sample as a vector element for the inner product calculation after the gain has been fixed at the constant value.

72. The receiver of claim 71, wherein the fixed magnitude value is programmable.

73. The receiver of claim 69, wherein the frame synchronization unit identifies the largest absolute squared inner product value when the largest absolute squared inner product value is larger than a threshold.

74. The receiver of claim 73, wherein the threshold is programmable.

75. The receiver of claim 69, wherein the frame synchronization unit compares a current absolute squared inner product value with the largest absolute squared inner product value, stores the larger of the compared absolute squared inner product values, and identifies the stored absolute squared inner product value as the largest absolute squared inner product value if a previously identified absolute squared inner product value was identified more than a time period previously.

76. The receiver of claim 75, wherein the time period is programmable.

77. The receiver of claim 69, further comprising a quantizer that quantizes the observation samples to the nearest power of 2 value before the observation samples are used in one of the vectors.

78. A receiver comprising:
multiple antennas that receive observations of a wireless signal;
a carrier frequency offset estimation unit that generates a correlation of the observations for each of the antennas, averages the correlations over all of the antennas, and estimates a carrier frequency offset based on the angle of the averaged correlations;
a gain control unit that measures power levels of the observations, identifies a largest power level among the measured power levels, and selects an amplifier gain based on the largest measured power level; and
an amplifier that applies the amplifier gain to each of the observations.

79. The receiver of claim 78, wherein the carrier frequency offset estimation unit generates the correlation by multiplying a current observation sample and the complex conjugate of a delayed version of the observation sample.

80. The receiver of claim 78, further comprising a carrier frequency offset correction unit that corrects the carrier frequency offset for subsequent observation samples based on the estimated carrier frequency offset.

81. The receiver of claim 78, wherein the wireless signal is transmitted according to the IEEE 802.11a standard, and wherein the wireless signal includes a short preamble and a long preamble, and the carrier frequency offset estimation unit estimates the carrier frequency offset using the short preamble, the receiver further comprising a carrier frequency offset correction unit that corrects the carrier frequency offset from the long preamble.

82. The receiver of claim 81, wherein the carrier frequency offset estimation unit re-estimates the carrier frequency offset using the corrected long preamble, and the carrier frequency offset correction unit corrects the carrier frequency offset in the wireless signal following the end of the long preamble based on the re-estimated carrier frequency offset.

83. The receiver of claim 82, further comprising adding an offset value to the correction of the carrier frequency offset following the end of the long preamble.

84. The receiver of claim 82, wherein the gain control unit adjusts the amplifier gain applied to each of the observations at the beginning of the short preamble, wherein the carrier frequency offset estimation unit estimates the carrier frequency offset using the short preamble after the amplifier gain adjustment.

85. A wireless receiver comprising:
multiple antennas that receive observations of a wireless signal;
a gain control unit that measures power levels of the observations, identifies a largest power level among the measured power levels, selects an amplifier gain based on the largest measured power level, and adjusts the amplifier gain to a fixed value so that the largest power level does not exceed a threshold;
an amplifier that applies the adjusted amplifier gain to each of the observations; and
a frame synchronization unit that calculates an absolute squared value of an inner product between a unit vector of observation samples from the antennas and a time delayed unit vector of observation samples from the antennas, and identifies a largest absolute squared inner product value among the calculated absolute squared inner product values,
wherein the frame synchronization unit converts each component of an observation sample to a sign magnitude value having a sign that is the same as the sign of the observation sample but a magnitude that is a fixed magnitude value while the gain is adjusted, uses the sign magnitude value as a vector element for the inner product calculation while the gain is adjusted, and uses the observation sample as a vector element for the inner product calculation after the gain has been adjusted to the fixed value.

86. The receiver of claim 85, wherein the gain control unit determines whether the largest power level exceeds a threshold, and decreases the amplifier gain in a series of fixed increments until the largest power level does not exceed the threshold and, upon determining that the largest power level does not exceed the threshold, adjusts the amplifier gain to the fixed value so that the largest power level is substantially equal to a reference power level.

87. A method comprising:
receiving observations of a wireless signal via multiple antennas;
measuring power levels of the observations;
identifying a largest power level among the measured power levels;
selecting an amplifier gain based on the largest measured power level;
adjusting the amplifier gain to a fixed value so that the largest power level does not exceed a threshold;
applying the adjusted amplifier gain to each of the observations; and
performing frame synchronization, wherein frame synchronization includes:
calculating an absolute squared value of an inner product between a unit vector of the observation samples from the antennas and a time delayed unit vector of the observation samples from the antennas,
identifying a largest absolute squared inner product value among the calculated absolute squared inner product values, converting each component of each of the observation samples to a sign magnitude value having a sign that is the same as the sign of the observation sample but a magnitude that is a fixed magnitude value while the gain is adjusted,
using the sign magnitude value as a vector element for the inner product calculation while the gain is adjusted, and
using the observation sample as a vector element for the inner product calculation after the gain has been adjusted to the fixed value.

88. The method of claim 87, further comprising:
determining whether the largest power level exceeds a threshold;
decreasing the amplifier gain in a series of fixed increments until the largest power level does not exceed the threshold; and
upon determining that the largest power level does not exceed the threshold, adjusting the amplifier gain to the fixed value so that the largest power level is substantially equal to a reference power level.

89. A wireless receiver comprising:
multiple antennas that receive observations of a wireless signal;
an amplifier that applies a gain to each of the observations;
a gain control unit that measures power levels of the observations, adjusts the amplifier gain during a preamble period of the wireless signal based on at least one of the measured power levels, and adjusts the gain to a fixed value when a largest one of the measured power levels is less than a threshold level; and
a frame synchronization unit that synchronizes a frame of the wireless signal, wherein the frame synchronization unit uses a sign of the observations and a reference magnitude before the amplifier gain is adjusted to the fixed value, and uses the sign of the observations a magnitude of the observations as an observation vector after the amplifier gain is adjusted to the fixed value.

90. The receiver of claim 89, wherein the frame synchronization unit calculates an absolute squared value of an inner product between a unit vector of observation samples from the antennas and a time delayed unit vector of observation samples from the antennas, identifies a largest absolute squared inner product value among the calculated absolute squared inner product values, converts each component of an observation sample to a sign magnitude value having a sign that is the same as the sign of the observation sample but a magnitude that is the reference magnitude value while the gain is adjusted, uses the sign magnitude value as a vector element for the inner product calculation while the gain is adjusted, and uses the observation sample as a vector element for the inner product calculation after the gain has been adjusted to the fixed value.

91. A method comprising:
  receiving observations of a wireless signal via multiple antennas;
  amplifying the observations with a gain;
  measuring power levels of the observations;
  adjusting the gain during a preamble period of the wireless signal based on at least one of the measured power levels;
  adjusting the gain to a fixed value when a largest one of the measured power levels is less than a threshold level; and
  synchronizing a frame of the wireless signal, wherein frame synchronization uses a sign of the observations and a reference magnitude before the amplifier gain is adjusted to the fixed value, and uses the sign of the observations and a magnitude of the observations as an observation vector after the amplifier gain is adjusted to the fixed value.

92. The method of claim 91, wherein synchronizing a frame comprises:
  calculating an absolute squared value of an inner product between a unit vector of observation samples from the antennas and a time delayed unit vector of observation samples from the antennas;
  identifying a largest absolute squared inner product value among the calculated absolute squared inner product values;
  converting each component of an observation sample to a sign magnitude value having a sign that is the same as the sign of the observation sample but a magnitude that is the reference magnitude value while the gain is adjusted;
  using the sign magnitude value as a vector element for the inner product calculation while the gain is adjusted; and
  using the observation sample as a vector element for the inner product calculation after the gain has been adjusted to the fixed value.

* * * * *

UNITED STATES PATENT AND TRADEMARK OFFICE
CERTIFICATE OF CORRECTION

PATENT NO. : 7,190,748 B2
APPLICATION NO. : 10/144445
DATED : March 13, 2007
INVENTOR(S) : Kim et al.

It is certified that error appears in the above-identified patent and that said Letters Patent is hereby corrected as shown below:

On Column 15, line 32, $k \geqq n+64$, should read --$k \geq n+64$--

Signed and Sealed this

Twenty-ninth Day of January, 2008

JON W. DUDAS
*Director of the United States Patent and Trademark Office*